J. R. HOPKINS.
Escapement for Watches.
No. 165,830.
Patented July 20, 1875.
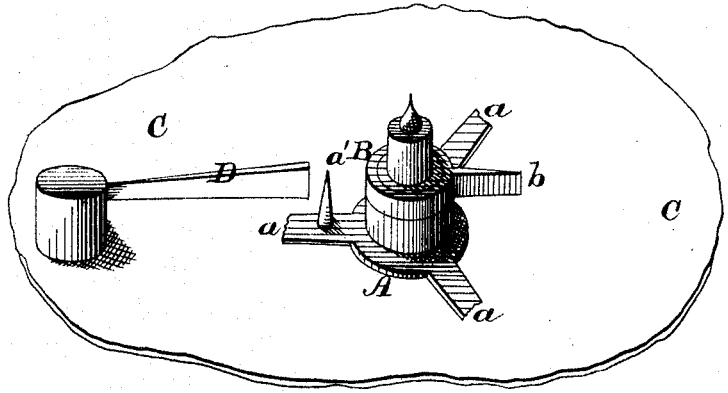
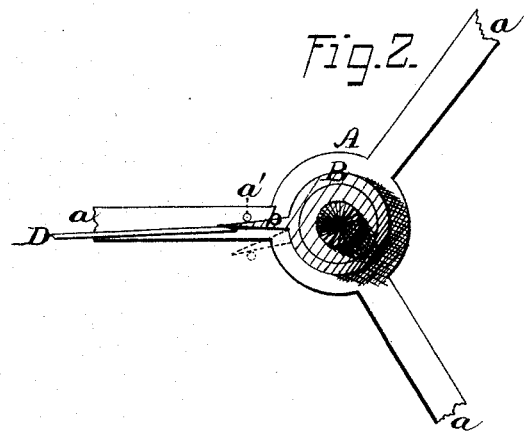
WITNESSES:
Jas. T. Hutchinson
John R. Young
INVENTOR:
Jason R. Hopkins by
Prindle and Co his Attys

United States Patent Office.

JASON R. HOPKINS, OF WASHINGTON, DISTRICT OF COLUMBIA, ASSIGNOR OF ONE-HALF HIS RIGHT TO WM. D. COLT, OF SAME PLACE.

IMPROVEMENT IN ESCAPEMENTS FOR WATCHES.

Specification forming part of Letters Patent No. 165,830, dated July 20, 1875; application filed July 14, 1875.

*To all whom it may concern:*

Be it known that I, JASON R. HOPKINS, of Washington, in the county of Washington and in the District of Columbia, have invented certain new and useful Improvements in Watches; and do hereby declare that the following is a full, clear, and exact description thereof, reference being had to the accompanying drawing, making a part of this specification, in which—

Figure 1 is a perspective view of the mechanism employed for preventing overbanking of the balance, and Fig. 2 is a plan view of the same, the full and dotted lines showing different positions of the operative parts.

Letters of like name and kind refer to like parts in each of the figures.

Great annoyance and irregularity is frequently occasioned by the overbanking of the balance of a chronometer escapement, to prevent which is the design of my invention, which consists in the construction of the stop mechanism employed for preventing overbanking of the balance, substantially as is hereinafter specified.

In the annexed drawing, A represents a balance-wheel of ordinary construction, provided upon the lower side, near the longitudinal center of one of its arms, $a$, with a pin, $a'$, which, from thence, extends downward for a short distance. Below said arm a collar, B, is journaled upon the staff of said balance, and is provided with an arm, $b$, that projects radially outward to a distance somewhat greater from the center than that of said pin, so that when said collar is turned until said arm $b$ bears against said pin, as shown in Fig. 2, the former will project beyond the latter. Secured at one end to or upon the watch-plate C is a spring, D, which is placed in a line with the pivotal center of the balance A upon the side at which the pin $a'$ is placed when said balance is at rest, and has such length as to cause the end of the arm $b$ to strike against its outer end whenever said balance is rotated sufficiently to bring said arm into the proper position. If, now, the balance has but one revolution in each direction the collar B will be carried around by its friction upon the staff of said balance until its arm $b$ comes into contact with the end of the spring D, when the motion of said collar and arm in such direction will be arrested. Upon the return movement of the balance said collar and arm will be rotated in an opposite direction until the latter is again arrested by contact with said spring D. Should the momentum of the balance be sufficient to give to it another revolution after the arm $b$ comes into contact with the spring-stop D the pin $a'$ will strike against said arm and arrest the further movement of said balance just before the latter reaches a point which will permit of the escape of a second tooth of the escape-wheel. Upon the return movement of said balance nearly two revolutions are permitted before its motion is again arrested. This arrangement, while giving all necessary freedom of motion to the balance, effectually prevents the derangement which so commonly results from an accidental increase in such motion in chronometer escapements.

Having thus fully set forth the nature and merits of my invention, what I claim as new, is—

In combination with the balance-wheel A, the pin $a'$, secured within and projecting downward from one of its arms $a$, the collar B, journaled upon the staff of said balance-wheel, and provided with the arm $b$, which may be caused to engage with said pin $a'$, and the stop-spring D, fixed to some relatively-fixed portion of the watch movement, so as to engage with and arrest the motion of said arm $a$, substantially as and for the purpose specified.

In testimony that I claim the foregoing I have hereunto set my hand this 12th day of July, 1875.

JASON R. HOPKINS.

Witnesses:
GEO. S. PRINDLE,
WILLIAM FITCH.